United States Patent
Jiang et al.

(10) Patent No.: US 10,321,381 B2
(45) Date of Patent: Jun. 11, 2019

(54) DEVICE, SYSTEM, AND METHOD FOR CUSTOMIZING USER-DEFINED MOBILE NETWORK

(71) Applicant: Huawei Technologies Co., Ltd., Shenzhen, Guangdong (CN)

(72) Inventors: Ming Jiang, Shanghai (CN); Ping Zhang, Shenzhen (CN)

(73) Assignee: Huawei Technolgies Co., Ltd., Shenzhen (CN)

( * ) Notice: Subject to any disclaimer, the term of this patent is extended or adjusted under 35 U.S.C. 154(b) by 986 days.

(21) Appl. No.: 14/812,932

(22) Filed: Jul. 29, 2015

(65) Prior Publication Data
US 2015/0334634 A1 Nov. 19, 2015

Related U.S. Application Data

(63) Continuation of application No. PCT/CN2013/071216, filed on Jan. 31, 2013.

(51) Int. Cl.
*H04W 48/02* (2009.01)
*H04W 48/00* (2009.01)
(Continued)

(52) U.S. Cl.
CPC ............. *H04W 48/02* (2013.01); *H04W 4/20* (2013.01); *H04W 48/00* (2013.01); *H04W 88/16* (2013.01)

(58) Field of Classification Search
CPC ....... H04W 48/00; H04W 48/02; H04W 4/20; H04W 88/16
See application file for complete search history.

(56) References Cited

U.S. PATENT DOCUMENTS

2003/0078987 A1 4/2003 Serebrennikov
2005/0037751 A1* 2/2005 Kim ................. H04L 12/66
  455/432.1
(Continued)

FOREIGN PATENT DOCUMENTS

CN 102077558 A 5/2011
CN 102202418 A 9/2011
(Continued)

*Primary Examiner* — Kan Yuen

(57) ABSTRACT

The present invention relates to a system, a device, and a method for customizing a user-defined network. The system includes a gateway and a mobile network element. The gateway is configured to receive a user-defined network request, request, according to the user-defined network request, an invocation of a communications service corresponding to the mobile network element to establish or modify the user-defined network, and return an invocation result. The user-defined network request includes definition information of an MBB communications service resource required by the MBB application service. The mobile network element is configured to implement invocation of the corresponding communications service. Therefore, the MBB communications service resources required by an MBB application are customized as required, and an invocation of the MBB communications service resources is associated with a requirement of the MBB application, thereby implementing reasonable utilization of the MBB communications service resources.

18 Claims, 5 Drawing Sheets

(51) Int. Cl.
*H04W 4/20* (2018.01)
*H04W 88/16* (2009.01)

(56) References Cited

U.S. PATENT DOCUMENTS

| | | | |
|---|---|---|---|
| 2010/0215003 A1* | 8/2010 | Zhao | H04L 12/14 |
| | | | 370/329 |
| 2011/0103278 A1 | 5/2011 | Ozawa | |
| 2012/0044874 A1* | 2/2012 | Ronneke | H04W 48/17 |
| | | | 370/328 |
| 2012/0147824 A1 | 6/2012 | Van der Merwe et al. | |
| 2013/0155964 A1* | 6/2013 | Miller | H04L 47/724 |
| | | | 370/329 |
| 2015/0229779 A1* | 8/2015 | Goermer | H04M 15/28 |
| | | | 370/259 |

FOREIGN PATENT DOCUMENTS

| | | |
|---|---|---|
| CN | 102323892 A | 1/2012 |
| CN | 102415157 A | 4/2012 |
| EP | 2 288 211 A1 | 2/2011 |
| RU | 2273107 C2 | 3/2006 |
| WO | 2010/127696 A1 | 11/2010 |
| WO | WO 2012/095259 A1 | 7/2012 |

* cited by examiner

DEVICE, SYSTEM, AND METHOD FOR CUSTOMIZING USER-DEFINED MOBILE NETWORK

CROSS-REFERENCE TO RELATED APPLICATIONS

This application is a continuation of International Application No. PCT/CN2013/071216, filed on Jan. 31, 2013, which is hereby incorporated by reference in its entirety.

TECHNICAL FIELD

The present invention relates to the field of communications technologies, and in particular, to a device, a system, and a method for customizing a user-defined mobile network.

BACKGROUND

Mobile broadband (MBB) has experienced fast innovation in the past ten-odd years, and a network capability continuously evolves from general packet radio service (GPRS) to Wideband Code Division Multiple Access (WCDMA), High Speed Packet Access (HSPA), and Long Term Evolution (LTE), making bandwidth that can be provided by a mobile network increase by approximately 1000 times.

Currently, an MBB application service based on an MBB communications service has been rapidly developing. However, the MBB application service does not utilize MBB communications service resources reasonably.

SUMMARY

Embodiments of the present invention provide a device, a system, and a method for customizing a user-defined mobile network, which are used to implement reasonable utilization of MBB communications service resources.

In a first aspect, an embodiment of the present invention provides a system for customizing a user-defined network, where the system includes: a user-defined gateway, configured to receive a user-defined network request of a mobile broadband MBB application service, invoke, according to the user-defined network request, a communications service corresponding to a mobile network element to establish or modify the user-defined network, and return an invocation result to the MBB application service, where the user-defined network request includes definition information of a communications service resource required by the MBB application service, and is used to request establishment or modification of the user-defined network; and the mobile network element, configured to implement invocation of the corresponding communications service for the user-defined gateway.

In a second aspect, an embodiment of the present invention provides a user-defined gateway, where the gateway include: a first interface, configured to interact with an MBB application service; a second interface, configured to interact with a mobile network element; and a controller, configured to receive a user-defined network request of the mobile broadband MBB application service through the first interface, invoke, according to the user-defined network request and through the second interface, a communications service corresponding to the mobile network element to establish or modify the user-defined network, and return an invocation result to the MBB application service through the first interface, where the user-defined network request includes definition information of a communications service resource required by the MBB application service, and is used to request establishment or modification of the user-defined network.

In a third aspect, an embodiment of the present invention provides a method for customizing a user-defined network, where the method includes: receiving, by a user-defined gateway, a user-defined network request of a mobile broadband MBB application service, where the user-defined network request includes definition information of a communications service resource required by the MBB application service, and is used to request establishment or modification of the user-defined network; invoking, by the user-defined gateway according to the user-defined network request, a communications service corresponding to a mobile network element to establish or modify the user-defined network; and returning, by the user-defined gateway, an invocation result to the MBB application service.

In a fourth aspect, an embodiment of the present invention provides a user-defined gateway, where the gateway includes: a network service defining unit and a network service control unit, where the network service defining unit is configured to receive a user-defined network request of a mobile broadband MBB application service, where the user-defined network request includes definition information of a communications service resource required by the MBB application service, and is used to request establishment or modification of the user-defined network; and the network service control unit is configured to invoke, according to the user-defined network request, a communications service corresponding to a mobile network element to establish or modify the user-defined network.

In the embodiments of the present invention, according to allocation dynamics and mobility of MBB communications service resources, MBB communications service resources required by an MBB application service are customized as required, so that a mobile network meeting a requirement can be customized for the MBB application service, thereby associating utilization of the MBB communications service resources with the requirement of the MBB application service, and implementing reasonable utilization of the MBB communications service resources.

BRIEF DESCRIPTION OF THE DRAWINGS

To describe the technical solutions in the embodiments of the present invention or in the prior art more clearly, the following briefly introduces accompanying drawings required for describing the embodiments or the prior art. Apparently, the accompanying drawings in the following description show merely some embodiments of the present invention, and a person of ordinary skill in the art may still derive other drawings according to these accompanying drawings without creative efforts.

DETAILED DESCRIPTION

Figure 1:
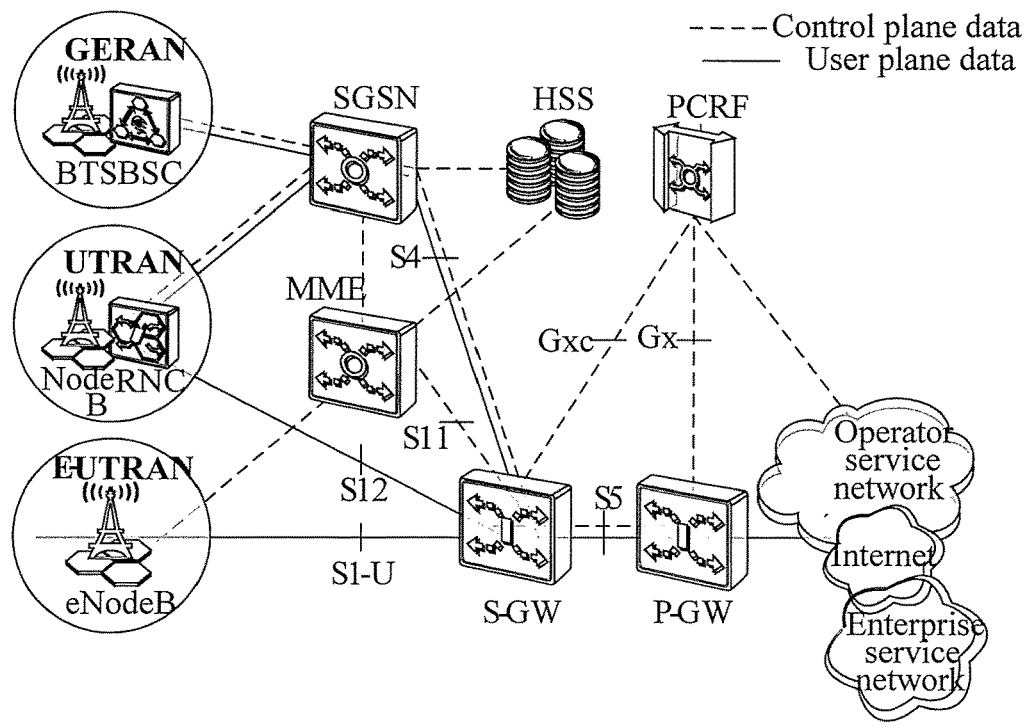
FIG. 1 is a schematic diagram of a networking architecture according to an embodiment of the present invention.

The following clearly describes the technical solutions in the embodiments of the present invention with reference to the accompanying drawings in the embodiments of the present invention. Apparently, the embodiments to be described are merely a part rather than all of the embodiments of the present invention. All other embodiments obtained by a person of ordinary skill in the art based on the embodiments of the present invention without creative efforts shall fall within the protection scope of the present invention.

The technical solutions provided in the embodiments of the present invention are applicable to various wireless communications networks, such as code division multiple access (CDMA), time division multiple access (TDMA), frequency division multiple access (FDAM), orthogonal frequency division multiple access (Multiple Access, OFDMA), single carrier frequency division multiple access (SC-FDMA), and other networks. The terms "network" and "system" may be used interchangeably. A CDMA network is capable of implementing wireless technologies, such as universal terrestrial radio access (UTRA) and CDMA2000. UTRA may include CDMA, WCDMA, and another variant of CDMA. CDMA2000 may cover an interim standard (IS) 2000 (IS-2000) and standards IS-95 and IS-856. A TDMA network is capable of implementing wireless technologies, such as global system for mobile communications (GSM). An OFDMA network is capable of implementing wireless technologies, such as evolved universal terrestrial radio access (Evolved UTRA, E-UTRA), ultra mobile broadband (UMB), IEEE 802.11 (Wi-Fi), IEEE 802.16 (WiMAX), IEEE 802.20, and Flash OFDMA. UTRA and E-UTRA are a UMTS and an evolved version of the UMTS. In long term evolution (LTE) and LTE Advanced (LTE-A), the 3GPP uses a new UMTS version of E-UTRA. UTRA, E-UTRA, UMTS, LTE, LTE-A, and GSM are described in documents of 3GPP standard organization. CDMA2000 and UMB are described in documents of 3GPP2 standard organization. Technologies described in the embodiments of the present invention are also applicable to the foregoing wireless networks and wireless technologies.

In the embodiments of the present invention, user equipments (UE) may be distributed on an entire wireless network, and each UE may be static or mobile. A UE may be called a terminal, a mobile station, a subscriber unit, a station, or the like. The UE may be a cellular phone, a personal digital assistant (PDA), a wireless modem, a wireless communications device, a handheld device, a laptop computer, a cordless phone, a wireless local loop (WLL) station, or the like.

In the embodiments of the present invention, an MBB application service refers to a service that is provided by using an MBB communications service. For example, the MBB application service may be a mobile personal instant communications service, an online map navigation service, a machine-to-machine virtual network service, a mobile office service, or the like. This is not limited in the embodiments of the present invention.

Network architectures and service scenarios described in the following embodiments of the present invention are intended to more clearly describe the technical solutions in the embodiments of the present invention, but are not intended to limit the technical solutions provided in the embodiments of the present invention. A person of ordinary skill in the art may know that as the network architectures evolve and a new service scenario emerges, the technical solutions provided in the embodiments of the present invention are also applicable to a similar technical problem.

A mobile broadband network in the 3rd generation partnership project (3GPP) is used as an example in the following description. It should be noted that the technical solutions and technical thoughts provided in the embodiments of the present invention may further be used on a broadband network accessed in another wireless access manner, such as a broadband network accessed by using WiFi.

FIG. 1 exemplarily shows a networking architecture of a 3GPP mobile broadband network.

As shown in FIG. 1, the 3GPP mobile broadband network (3GPP network for short) includes an access network and a core network.

The access network may include a GSM/EDGE radio access network (GERAN), a UMTS terrestrial radio access network (UTRAN), or an evolved universal terrestrial radio access network (E-UTRAN), where GSM is short for Global System for Mobile Communications, and EDGE is short for enhanced data rates for GSM evolution. The GERAN may include a base transceiver station (BTS) and a base station controller (BSC). The UTRAN may include a NodeB and a radio network controller (RNC). The E-UTRAN may include an evolved NodeB (eNodeB).

The core network may be an evolved packet core network (EPC) and may include a serving GPRS support node (SGSN), a mobility management entity (MME), a serving gateway (S-GW), a packet data network gateway (PGW), a home subscriber server (HSS), and a policy and charging rules function (PCRF) entity. The SGSN is mainly responsible for mobility management of the GERAN and the UTRAN; the MME is mainly responsible for mobility management of the E-UTRAN; the S-GW is a user-plane anchor between different access networks; the P-GW is an interface through which the EPC connects to an external network, such as an operator service network, the Internet, or an enterprise service network, and implements a gateway function of the EPC; the HSS is configured to store subscription information of users; and the PCRF is configured to implement control over and management of quality of service (QoS) and a charging policy. An S4 interface is set between the SGSN and the S-GW, an S11 interface is set between the MME and the S-GW, and an S5 interface is set between the S-GW and the P-GW, where the S4 interface may be used to transfer control-plane data and user-plane data between the SGSN and the S-GW, the S11 interface may be used to transfer control-plane data between the MME and the S-GW, and the S5 interface may be used to transfer control-plane data and user-plane data between the S-GW and the P-GW. A Gxc interface is set between the PCRF and the S-GW, and a Gx interface is set between the PCRF and the P-GW. Generally, the P-GW serves as an enforcement node for a QoS policy and may also be called a policy and charging enforcement function (PCEF) entity.

Different interfaces are also set between the access network and the core network and are used to transmit control-plane data and user-plane data. As shown in FIG. 1, interactions of control-plane data and user-plane data can be performed between the GERAN and the SGSN and between the UTRAN and the SGSN. An S12 interface is set between the UTRAN and the S-GW and used to transfer the user-plane data. An interaction of the control-plane data may be performed between the E-UTRAN and the MME. An S1-U interface is set between the E-UTRAN and the S-GW and used to transfer the user-plane data.

A user equipment may access the EPC through the GERAN, the UTRAN, or the E-UTRAN and then connect to an external network through the EPC.

Currently, a 3GPP networking architecture is an enclosed architecture, and it focuses on a bearing and control operation inside a network. As can be seen from FIG. 1, in this architecture, most network elements do not open an interface for an external network part (may be understood as a third party) to invoke a function of a network element inside the 3GPP network. In this architecture, control over each network element on the 3GPP network mainly originates from requirements of upstream and downstream nodes and a preconfigured resource policy, and a function and an interface of each network element on the 3GPP network are customized according to a predictable service model. In this architecture, only a limited network function invocation is provided externally. For example, the external network may perform QoS control through the PCRF in FIG. 1, but the QoS control is limited only to QoS control over an IP quintuple flow, and even user-based QoS control is not supported.

Because an MBB application service is developing rapidly and only a limited network function invocation is provided in this architecture, an MBB communications service cannot be effectively inherited by the MBB application service, further leading to that requirements of the MBB application service on the MBB communications service, such as individualization, a scenario-based quick change, and quick scalability of a service scale, cannot be met. Because the MBB application service cannot effectively interact with the MBB communications service, resource utilization efficiency is low and user experience of an MBB network is poor.

As can be seen from a providing manner of the MBB communications service, the MBB network provides a virtual communications service resource for a user through an entire network, that is, this kind of resource is not fixedly located in a particular location or fixedly allocated, but is temporarily allocated in a user access location and migrates as the user moves. Therefore, the MBB communications service itself has relatively flexible control over a network resource, and the MBB network is capable of improving network resource utilization efficiency and user experience by reusing or invoking the network resource more effectively.

In view of this, it may be considered to combine an invocation of MBB communications service resources and the MBB application service, so as to improve utilization efficiency of the MBB communications service resources.

In the embodiment of the present invention, a user-defined gateway is deployed on an MBB network to implement customization of an MBB communications service by an MBB application service, so that the MBB application service is capable of customizing a mobile network; and MBB communications service resources and an requirement of the MBB application service are effectively combined to improve utilization efficiency of MBB network resources.

The 3GPP MBB network shown in FIG. 1 is used as an example for description in the embodiment of the present invention, so as to more clearly describe the solution in the embodiment of the present invention.

Figure 2:
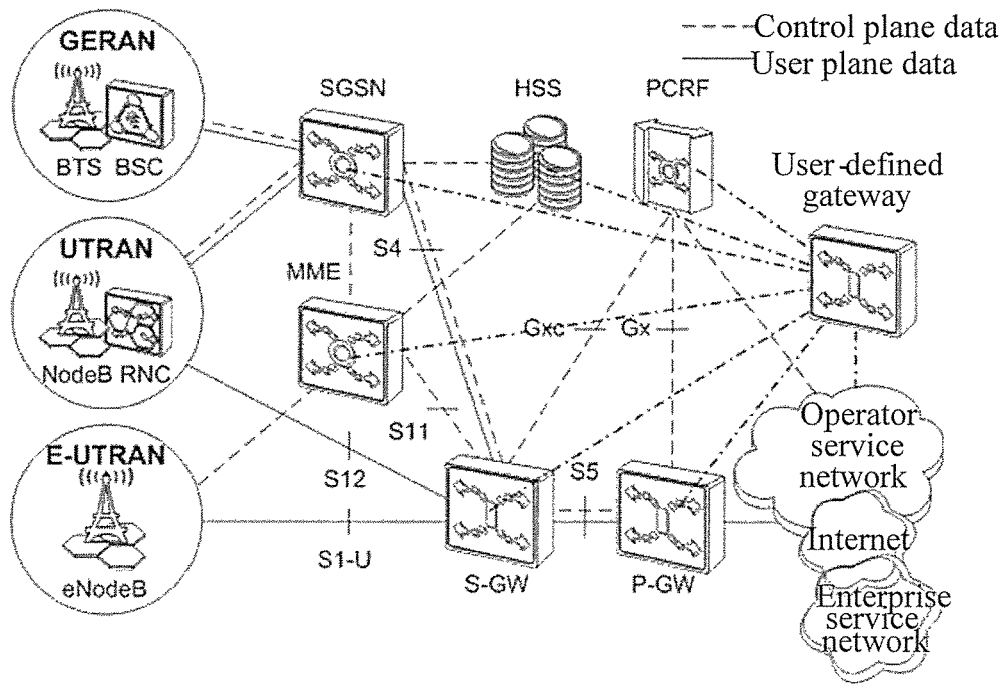
FIG. 2 is a schematic diagram of another networking architecture according to an embodiment of the present invention.

As shown in FIG. 2, in an embodiment of the present invention, a user-defined gateway is added in the networking architecture shown in FIG. 1. It should be noted that a networking structure shown in FIG. 2 is only an example, and the user-defined gateway may also be integrated with another network element on an EPC, for example, integrated with a PCRF or configured on a P-GW. The user-defined gateway interconnects to every network element on the EPC, may interconnect to some network elements on the EPC according to an actual operation requirement, or may connect to an access network element. In addition, the user-defined gateway connects to an external network. Exemplarily, various interfaces complying with an internal EPC standard, such as an Rx interface, may be set on the user-defined gateway to implement an interconnection between an internal EPC network element and the user-defined gateway. An external interface complying with a general protocol may also be set on the user-defined gateway. For example, a simple object access protocol (Simple Object Access Protocol, SOAP) interface is set to implement external openness of an MBB communications service API for an external MBB application service to invoke an MBB communications service; or, a man-machine interface may be set on the user-defined gateway, and invocation of MBB communications service by the external MBB application service is implemented through the man-machine interface.

Figure 3:
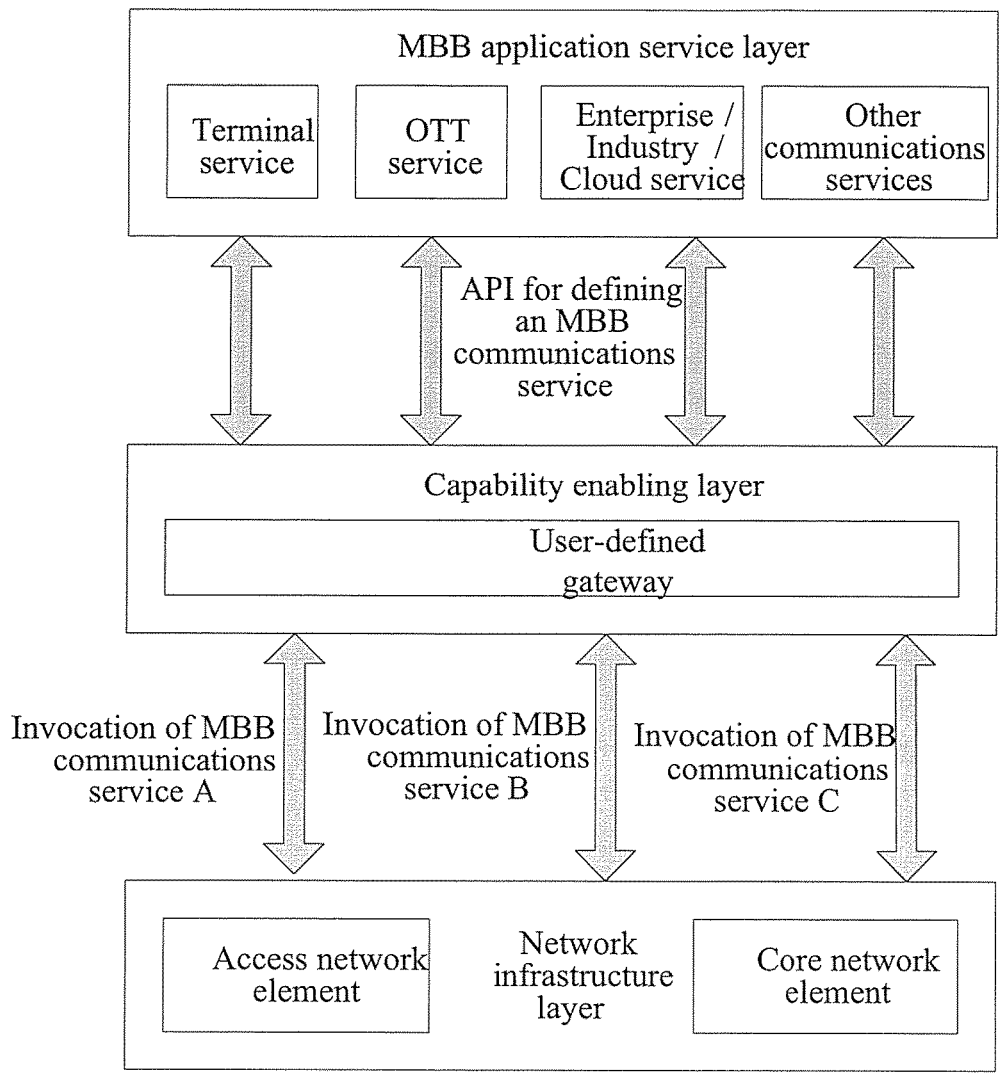
FIG. 3 is a schematic diagram of a network architecture according to an embodiment of the present invention.

An abstract network architecture shown in FIG. 3 can be obtained through abstracting the networking architecture shown in FIG. 2. In FIG. 3, the entire architecture can be divided into three layers, where the bottom layer is a network infrastructure layer, the intermediate layer is a capability opening layer, and the top layer is an MBB application service layer. The network infrastructure layer is formed by abstracting various core network elements and access network elements, the capability opening layer is formed by abstracting a user-defined gateway, and the MBB application service layer is formed by abstracting various MBB application services (such as a terminal service, an OTT service, an enterprise/industry/cloud service, and another communications service). The network infrastructure layer provides the capability opening layer with invocations of various MBB communications services (for example, an invocation of MBB communications service A, an invocation of MBB communications service B, and an invocation of MBB communications service C that are shown in FIG. 3), and the capability opening layer provides a unified API for defining an MBB communications service. As can be seen, in this abstract architecture, the capability opening layer is a layer where the invocations of various MBB communications services gather, and provides the MBB application service at the upper layer with the unified API for defining an MBB communications service. In this way, the MBB application service is capable of effectively integrating the MBB communications service through the unified API for defining an MBB communications service, so that a requirement of the MBB application service can be associated with MBB communications service resources, thereby implementing customization of the MBB communications service resources and further implementing reasonable utilization of the MBB communications service resources. In addition, it is avoided that the MBB application service processes different internal network element interfaces on a mobile network, and implementation of the invocation of the MBB communications service is simplified.

From the angle of the MBB application service layer, the capability opening layer and the network infrastructure layer may be put together and considered as a system for customizing a user-defined network. By interacting with the system for customizing a user-defined network, the MBB application service layer is capable of implementing the customization of the MBB communications service resources and customizing a network meeting the requirement of the MBB application service.

With reference to FIG. 2, FIG. 3, and the foregoing thoughts in the present invention, an embodiment of the present invention exemplarily provides a system for customizing a user-defined network to enable an MBB application service to customize utilization of MBB communications service resources, so as to reasonably use the MBB communications service resources.

Figure 4:
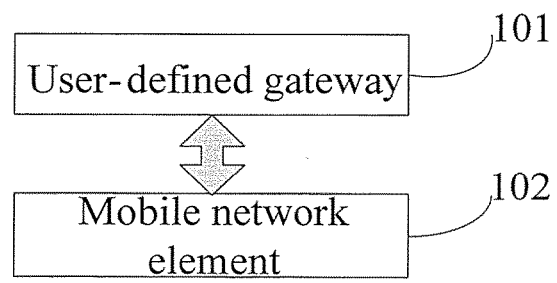
FIG. 4 is a schematic structural diagram of a system for customizing a user-defined network according to an embodiment of the present invention.

As shown in FIG. 4, the system for customizing a user-defined network includes: a user-defined gateway 101 and at least one mobile network element 102.

Exemplarily, the user-defined gateway 101 is configured to receive a user-defined network request of an MBB application service, invoke, according to the user-defined network request, a communications service corresponding to a mobile network element to establish or modify the user-defined network, and return an invocation result to the MBB application service, where the user-defined network request includes definition information of a communications service resource required by the MBB application service, and is used to request establishment or modification of the user-defined network.

Exemplarily, the mobile network element 102 is configured to implement invocation of the corresponding communications service for the user-defined gateway.

Exemplarily, the mobile network element 102 may be a core network element or an access network element.

The user-defined network request of the MBB application service in the embodiment of the present invention refers to a user-defined network request related to a certain MBB application service.

Exemplarily, the user-defined network request of the MBB application service may be sent by a corresponding program of the MBB application service or a server of the MBB application service to the user-defined gateway in a manner of invoking an API externally provided by the user-defined gateway, or may be sent by a provider of the MBB application service to the user-defined gateway by using a man-machine interface provided by the user-defined gateway. This is not limited in the embodiment of the present invention.

Exemplarily, the definition information of the communications service resource required by the MBB application service may include one or more of the following: user definition information, network definition information, and behavior definition information.

The user definition information may be information used to define a user using the user-defined network. Exemplarily, the user definition information may include: personal user information, such as identifier information of an individual user on a mobile network, which may be an international mobile subscriber identity (IMSI), a mobile station international ISDN number (MSISDN), or the like; device user information, such as an IP address and other information identifying a device; and user group information, which may be, for example, a set of individual users or device users.

The network definition information may be information used to define coverage of the user-defined network. Exemplarily, the network definition information may include: geographical area information, such as longitude and latitude, administrative planning, terrain, a landmark, and other geographical identifier information; physical network area information, such as cell information, service area information, routing area information, access point information, and other network unit information; and virtual subnet information, such as information about how to partition a virtual subnet.

The behavior definition information may be information used to define an action or a condition of a user on the user-defined network. The behavior definition information may include: security definition information, such as information about defining an authentication policy and a certification policy; service definition information, such as information about defining an access point name APN of an access point that a user can access, an IP address of an accessible server, and an accelerating and caching policy; access definition information, such as information about defining an access type and a roaming manner; bearer definition information, such as information about defining the number of connections, a bandwidth guarantee, and a tunneling mechanism; operation and maintenance definition information, such as information about defining an alarm, tracing, and how to perform statistics collection and reporting; and condition definition information, such as defining an idle state and an overloaded state.

Exemplarily, the user-defined gateway 101 may orchestrate multiple MBB communications services provided by the mobile network element, such as MBB communications service A1, MBB communications service A2, and MBB communications service A3, to form an integrated API for defining an MBB communications service, such as API A for defining an MBB communications service, that is provided for the MBB application service to invoke. For the MBB application service, only API A is visible. When the MBB application service invokes API A, it actually invokes the orchestrated MBB communications services A1, A2, and A3. For example, the mobile network element provides the user-defined gateway with three APIs for invoking an MBB communications service, which are API B1 for acquiring subscription data of a user, API B2 for acquiring an identifier of a user group, and API B3 for modifying subscription data of the user. After orchestration performed by the user-defined gateway 101, API B for defining an MBB communications service is formed: deleting the user from a certain user group. When the MBB application service invokes API B, according to the orchestration, the user-defined gateway 101 firstly invokes B1 to acquire subscription information of the user, then invokes B2 to acquire the identifier of the user group, and finally invokes B3 to delete the identifier of the user group from the subscription information of the user. In this way, the MBB application service does not need to separately invoke API B1, API B2, and API B3 to implement a function of API B. In view of this, that the user-defined gateway 101 is configured to invoke, according to the user-defined network request, a communications service corresponding to a mobile network element to establish or modify the user-defined network may specifically include the following: The user-defined gateway 101 is configured to: orchestrate, according to the user-defined network request, the communications service corresponding to the mobile network element to establish or modify the user-defined network; and invoke the corresponding communications service according to an orchestration result.

Exemplarily, the following manner may be used by the user-defined gateway 101 to invoke a communications service of the mobile network element: The user-defined gateway 101 sends a communications service invoking request to the mobile network element, where the request may include the definition information of the communications service resource; and the user-defined gateway 101 receives a result of an invocation performed by the mobile network element, where the mobile network element may feed back a one-off performing result or may feed back a periodical performing result.

Exemplarily, the user-defined gateway 101 may further interconnect to an external business and operation support system (BOSS). Correspondingly, the user-defined gateway 101 is further configured to: subscribe to the communications service of the mobile network element on the BOSS, where the communications service needs to be invoked; and create a bill of the invoked communications service of the mobile network element through the BOSS, so as to perform charging for the communications resource used by the MBB application service.

Exemplarily, in order to enhance security of the user-defined network, the user-defined gateway 101 may further authenticate an MBB application service party to determine whether the MBB application service party has permission to invoke a communications service provided by a mobile network. In view of this, the user-defined gateway 101 is further configured to authenticate the MBB application service to determine whether to invoke, according to the user-defined network request of the MBB application service, the communications service corresponding to the mobile network element.

Exemplarily, the user-defined gateway 101 may further be configured to report an operational report of the user-defined network to the MBB application service, in order to enable the MBB application service to monitor an operating condition of an MBB communications service invoked by the MBB application service to further determine how to invoke the MBB communications service.

Exemplarily, after the user-defined network is established, the user-defined gateway 101 may further be configured to initiate deletion of the user-defined network according to a request of the MBB application service or according to a configuration rule, that is, release communications service resources of the mobile network that are used by the user-defined network.

Exemplarily, after the user-defined network is established, the user-defined gateway 101 is configured to return the invocation result to the MBB application service, where the invocation result may carry an identifier of the user-defined network.

Exemplarily, the mobile network element may further register a communications service provided by it with the user-defined gateway. In view of this, the mobile network element is further configured to register the communications service of the mobile network element with the user-defined gateway 101.

According to the system for customizing a user-defined network provided in the embodiment shown in FIG. 4, a communications service of a mobile network element is invoked according to a user-defined network request of an MBB application service, so as to establish a mobile network customized by the MBB application service. In other words, MBB communications service resources required by the MBB application service are customized as required, so that the MBB application service is capable of customizing a mobile network meeting a requirement. In this way, utilization of the MBB communications service resources is associated with a requirement of the MBB application service, thereby implementing reasonable utilization of the MBB communications service resources.

Figure 5:
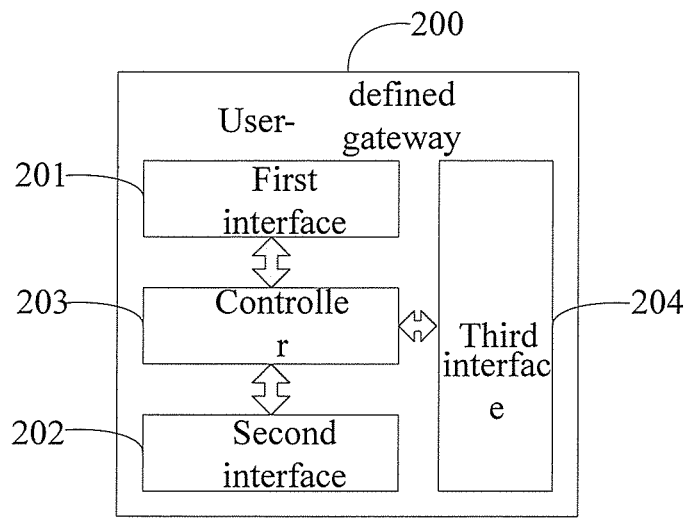
FIG. 5 is a schematic structural diagram of a user-defined gateway according to an embodiment of the present invention.
Figure 6:
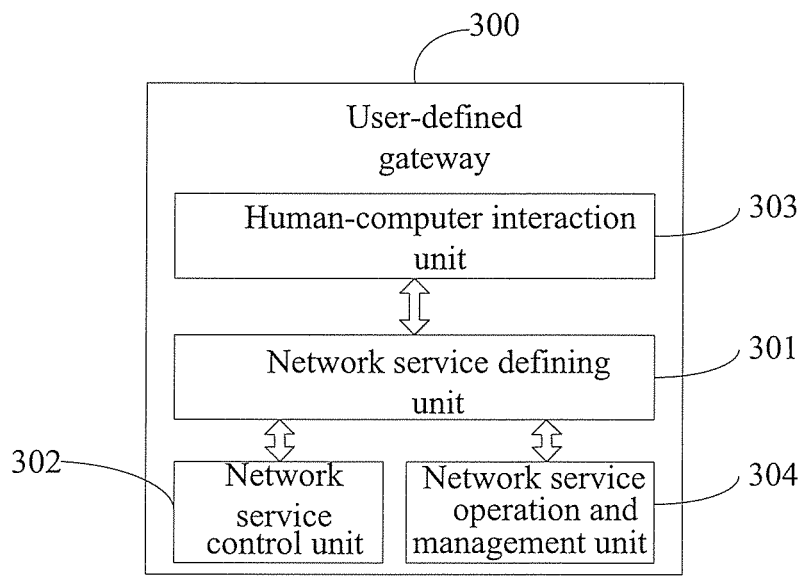
FIG. 6 is a schematic structural diagram of another user-defined gateway according to an embodiment of the present invention.

There are various implementation manners for the user-defined gateway in the embodiment shown in FIG. 4, and embodiments shown in FIG. 5 and FIG. 6 provide different implementation manners for reference.

The embodiment shown in FIG. 5 provides a user-defined gateway, so as to implement a function of the user-defined gateway in the embodiment shown in FIG. 4.

As shown in FIG. 5, the user-defined gateway 200 includes: a first interface 201, a second interface 202, and a controller 203.

The first interface 201 is configured to interact with an MBB application service; the second interface 202 is configured to interact with a mobile network element; and the controller 203 is configured to receive a user-defined network request of the mobile broadband MBB application service through the first interface 201, invoke, according to the user-defined network request and through the second interface 202, a communications service corresponding to the mobile network element to establish or modify the user-defined network, and return an invocation result to the MBB application service through the first interface 201, where the user-defined network request includes definition information of a communications service resource required by the MBB application service, and is used to request establishment or modification of the user-defined network.

Exemplarily, the definition information of the communications service resource required by the MBB application service may include user definition information, network definition information, and behavior definition information. For detailed content, reference may be made to related content in the embodiment shown in FIG. 4, and therefore no further details are provided herein.

Exemplarily, that the controller 203 is configured to invoke, according to the user-defined network request and through the second interface 202, a communications service corresponding to the mobile network element to establish or modify the user-defined network specifically includes the following: The controller 203 is configured to: orchestrate, according to the user-defined network request, the communications service corresponding to the mobile network element to establish or modify the user-defined network; and invoke the corresponding communications service through the second interface 202 according to an orchestration result.

Exemplarily, the user-defined gateway further includes a third interface 204, where the third interface 204 is configured to interact with a BOSS; and the controller 203 is further configured to subscribe to the corresponding communications service on the BOSS through the third interface 204 and create a bill of the corresponding communications service based on the BOSS through the third interface 204.

Exemplarily, the controller 203 is further configured to authenticate the MBB application service through the first interface 201 to determine whether to invoke, according to the user-defined network request, the communications service corresponding to the mobile network element.

Exemplarily, the controller 203 is further configured to report an operational report of the user-defined network through the first interface 201 to the MBB application service.

Exemplarily, the controller 203 is further configured to initiate deletion of the user-defined network according to a request of the MBB application service or according to a configuration rule.

Exemplarily, if the controller 203 is configured to invoke, according to the user-defined network request and through the second interface 202, the communications service corresponding to the mobile network element to establish the user-defined network, the invocation result includes an identifier of the user-defined network.

It should be noted that the interfaces in the embodiment of the present invention, such as the first interface, the second interface, and the third interface, may be multiple interfaces physically and may also be multiple interfaces logically. The controller in the embodiment of the present invention may be composed of multiple components, which is not limited in the embodiment of the present invention.

The embodiment shown in FIG. 6 provides another user-defined gateway, to implement a function of the user-defined gateway in the embodiment shown in FIG. 4.

As shown in FIG. 6, the user-defined gateway 300 includes: a network service defining unit 301 and a network service control unit 302.

The network service defining unit 301 is configured to receive a user-defined network request of a mobile broadband MBB application service, where the user-defined network request includes definition information of a communications service resource required by the MBB application service, and is used to request establishment or modification of the user-defined network; and the network service control unit 302 is configured to invoke, according to the user-defined network request, a communications service corresponding to a mobile network element to establish or modify the user-defined network.

Exemplarily, the user-defined gateway 300 further includes: a human-computer interaction unit 303, configured to provide a human-computer interaction interface of the user-defined network request and forward the user-defined network request to the network service defining unit 301.

Exemplarily, the network service control unit is further configured to feed back an invocation result to the network service defining unit, and the network service defining unit generates a response message of the user-defined network request according to the invocation result, and sends the response message to the MBB application service.

Exemplarily, the definition information of the communications service resource required by the MBB application service may include user definition information, network definition information, and behavior definition information. For detailed content, reference may be made to related content in the embodiment shown in FIG. 4, and therefore no further details are provided herein.

Exemplarily, that the network service control unit 302 is configured to invoke, according to the user-defined network request, a communications service corresponding to a mobile network element to establish or modify the user-defined network specifically includes the following: The network control unit 302 is configured to orchestrate, according to the user-defined network request, the communications service corresponding to the mobile network element to establish or modify the user-defined network; and the user-defined gateway invokes the corresponding communications service according to an orchestration result.

Exemplarily, the network service control unit 302 is further configured to subscribe to the corresponding communications service on a BOSS; and the user-defined gateway 300 further includes a network service operation and management unit 304, configured to create a bill of the corresponding communications service through the BOSS.

Exemplarily, the network service operation and management unit 304 is further configured to authenticate the MBB application service for the network service defining unit 301 to determine whether to invoke, according to the user-defined network request, the communications service corresponding to the mobile network element.

Exemplarily, the network service control unit 302 is further configured to report an operational report of the user-defined network to the network service defining unit 301, and the network service defining unit 301 is further configured to send the operational report of the user-defined network to the MBB application service.

Exemplarily, the network service defining unit 301 initiates deletion of the user-defined network according to a request of the MBB application service or according to a configuration rule.

Exemplarily, if the network service control unit 302 invokes, according to the user-defined network request, the communications service corresponding to the mobile network element to establish the user-defined network, where the invocation result includes an identifier of the user-defined network.

According to the user-defined gateways provided in the embodiments shown in FIG. 5 and FIG. 6, a communications service corresponding to a mobile network element is invoked according to a request of an MBB application service for establishing or modifying a user-defined network, so that a user-defined mobile network can be customized for the MBB application service, and a requirement of the MBB application service and an MBB communications service resource are effectively matched, thereby implementing reasonable utilization of the MBB communications service resource.

The following exemplarily introduces the system for customizing a user-defined network shown in FIG. 4 and working mechanisms of the user-defined gateways shown in FIG. 5 and FIG. 6. A method for customizing a user-defined network provided in the embodiment shown in FIG. 7 is an exemplary description for the system for customizing a user-defined network shown in FIG. 4 and the working mechanisms of the user-defined gateways shown in FIG. 5 and FIG. 6.

Figure 7:
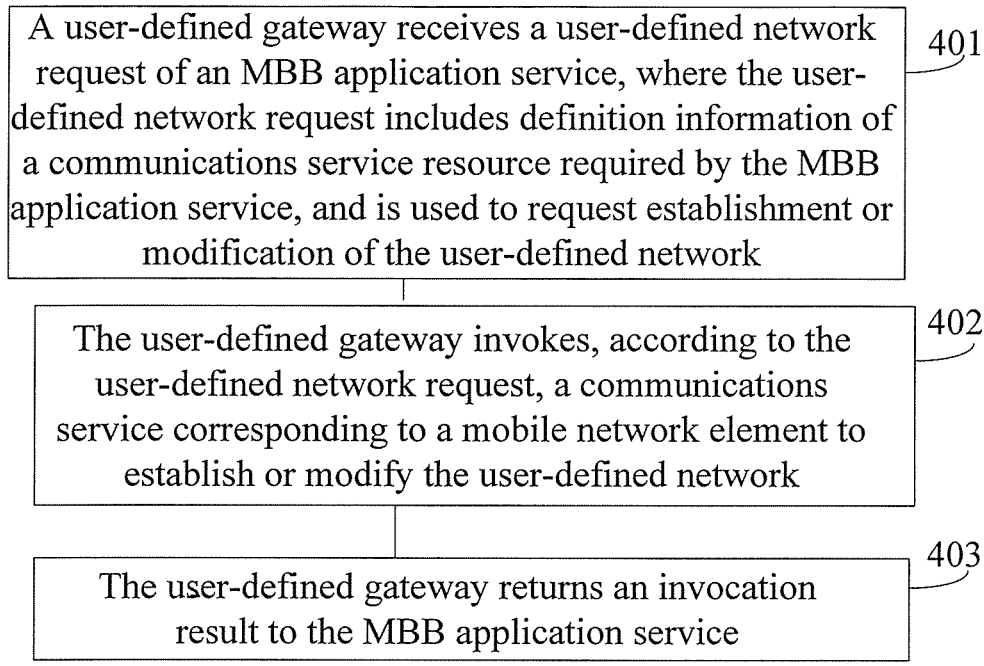
FIG. 7 is a schematic flowchart of a method for customizing a user-defined network according to an embodiment of the present invention.

As shown in FIG. 7, the method includes:

401. A user-defined gateway receives a user-defined network request of an MBB application service, where the user-defined network request includes definition information of a communications service resource required by the MBB application service, and is used to request establishment or modification of the user-defined network.

402. The user-defined gateway invokes, according to the user-defined network request, a communications service corresponding to a mobile network element to establish or modify the user-defined network.

403. The user-defined gateway returns an invocation result to the MBB application service.

Exemplarily, the definition information of the communications service resource required by the MBB application service may include user definition information, network definition information, and behavior definition information. For detailed content, reference may be made to related content in the embodiment shown in FIG. 4, and therefore no further details are provided herein.

Exemplarily, that the user-defined gateway invokes, according to the user-defined network request, a communications service corresponding to a mobile network element to establish or modify the user-defined network includes: orchestrating, by the user-defined gateway according to the user-defined network request, the communications service corresponding to the mobile network element to establish or modify the user-defined network; and invoking, by the user-defined gateway, the corresponding communications service according to an orchestration result.

Exemplarily, the method further includes: subscribing to, by the user-defined gateway, the corresponding communications service on a business and operation support system BOSS; and creating, by the user-defined gateway, a bill of the corresponding communications service through the BOSS.

Exemplarily, the method further includes: authenticating, by the user-defined gateway, the MBB application service to determine whether to invoke, according to the user-defined network request, the communications service corresponding to the mobile network element.

Exemplarily, the method further includes: reporting, by the user-defined gateway, an operational report of the user-defined network to the MBB application service.

Exemplarily, the method further includes: initiating, by the user-defined gateway, deletion of the user-defined network according to a request of the MBB application service or according to a configuration rule.

Exemplarily, if the user-defined gateway invokes, according to the user-defined network request, the communications service corresponding to the mobile network element to establish the user-defined network, where the invocation result includes an identifier of the user-defined network.

According to the method provided in the embodiment shown in FIG. 7, a user-defined gateway invokes, according to a request of an MBB application service for establishing or modifying a user-defined network, a communications service corresponding to a mobile network element, so that a user-defined mobile network can be customized for the MBB application service, and a requirement of the MBB application service and an MBB communications service resource are effectively matched, thereby implementing reasonable utilization of the MBB communications service resource.

The method for customizing a user-defined network provided in the embodiment of the present invention is described through examples in combination with a specific case, so as to describe the technical solution in this embodiment of the present invention in more detail.

Figure 8:
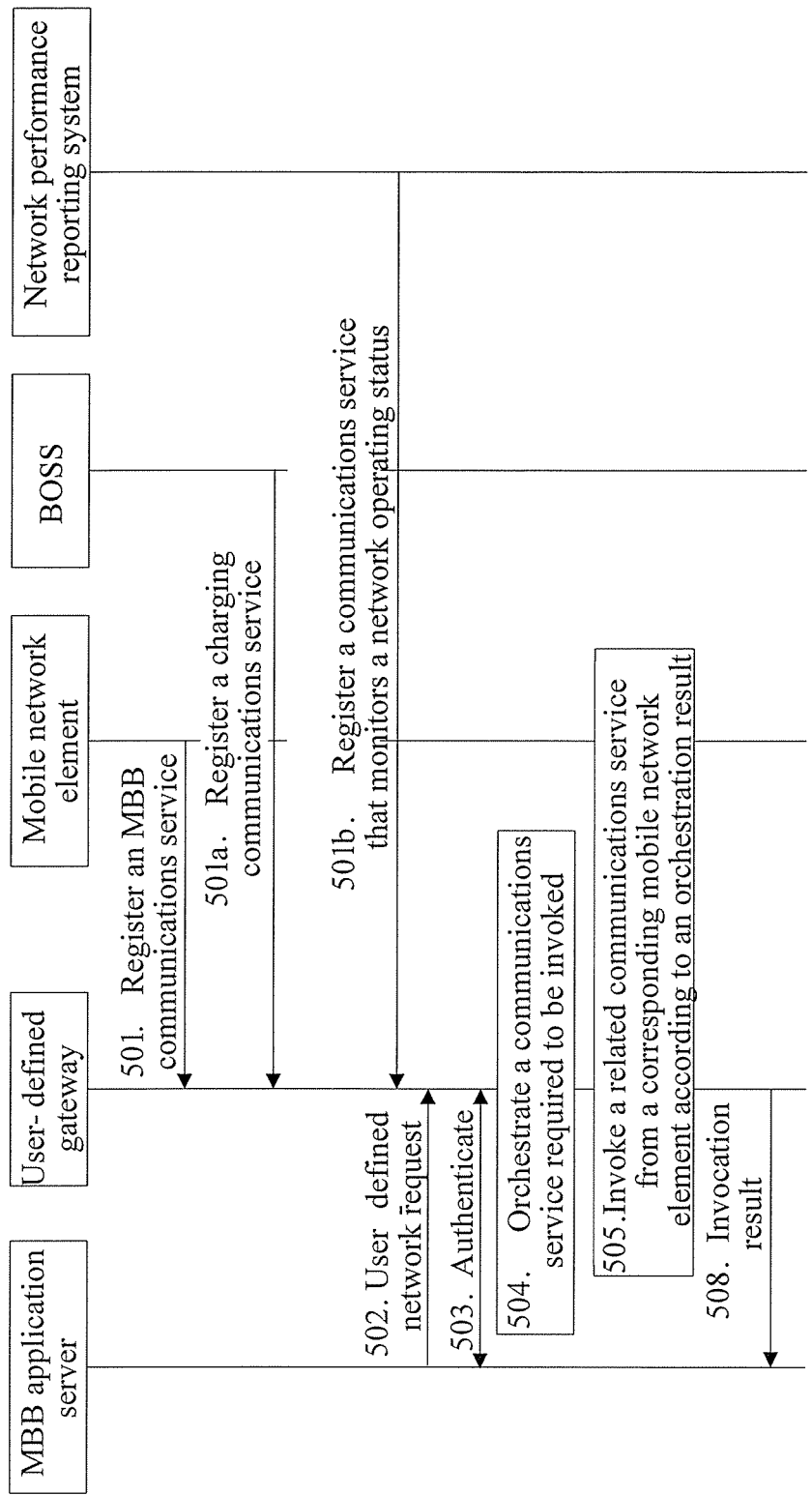
FIG. 8 is a signaling interaction diagram of a method for customizing a user-defined network according to an embodiment of the present invention.

As shown in FIG. 8, the method includes:

501. A mobile network element registers an MBB communications service provided by it with a user-defined gateway.

The mobile network element generally refers to a network element of a mobile network, including an access network element and a core network element. In the embodiment of the present invention, that a mobile network element registers an MBB communications service provided by it with a user-defined gateway is an optional step. The MBB communications service of the mobile network element is registered with the user-defined gateway, which facilitates the user-defined gateway to invoke the MBB communications service of the mobile network element.

Exemplarily, a specific implementation manner of registering, by the mobile network element, its MBB communications service with the user-defined gateway may be registering, by the mobile network element, an API of the MBB communications service with the user-defined gateway.

Exemplarily, 501*a* and 501*b* may also be optional steps 501*a*. A BOSS registers a communications service charged by it with the user-defined gateway, for example, may register a corresponding API, for the user-defined gateway to conveniently invoke an API of the BOSS, to subscribe to the communications service of the mobile network element and create a bill of the corresponding communications service; and 501*b*. A network performance reporting system registers its communications service monitoring a network operating condition, which may be, for example, a corresponding API, with the user-defined gateway for the user-defined gateway to conveniently invoke the network performance reporting system to acquire an operational report of a user-defined network.

502. An MBB application server sends a user-defined network request to the user-defined gateway.

The user-defined network request includes definition information of a communications service resource required by an MBB application service. For related content, reference may be made to the embodiment shown in FIG. 4, and therefore no further details are provided herein. Exemplarily, the MBB application server may send the user-defined network request to the user-defined gateway in a manner of invoking an API, and the definition information of the communications service resource may be transferred as a parameter of the API to the user-defined gateway.

Alternatively, in 502, an MBB application service party may input definition information of the related communications service resource through a man-machine interface to send the user-defined network request to the user-defined gateway.

An example in which a tourism company establishes a user-defined network is used for description herein: The user-defined network request includes the following definition information: 1) an individual user: a manager in the tourism company, a tour guide, or a personal tourist; 2) a user group: a tourist group or a business tourist group; 3) a geographical area: city A; 4) a physical network area: RA1 and RA2; 5) a virtual subnet: downtown and suburb; 6) security definition: a general VPN and automatic client authentication; 7) service definition: a portal of the tourism company, a hotel service, a roaming service, and a video service (busy time 18:30-21:00, caching, special charging); 8) access definition: preferred 3G access, automatic WiFi access, and inter-provincial roaming allowed; 9) bearer definition: the number of connections 1000, a bandwidth guarantee 100 M, and a maximum bandwidth 200 M; and 10) operation and maintenance definition: a statistical report and an alarm.

Step 503 is an optional step.

503. The user-defined gateway authenticates the MBB application service party to determine whether the MBB application service party has permission to request establishment or modification of the user-defined network.

Exemplarily, if the MBB application service party does not have the permission, a failure response may be returned to the MBB application service party; and if the MBB application service party has the permission, the following steps may proceed.

504. The user-defined gateway orchestrates, according to the user-defined network request, a communications service required to be invoked.

Exemplarily, according to the user-defined network request of the tourism company in 502, communications services that are required to be invoked and are orchestrated by the user-defined gateway are: 1) a user and user group defining communications service; 2) a network defining communications service; 3) a security defining communications service; 4) a service defining communications service;

5) an access defining communications service; 6) a bearer defining communications service; 7) a statistical report generating communications service; 8) an event report generating communications service; and 9) a charging defining communications service.

505. The user-defined gateway invokes a related communications service from a corresponding mobile network element according to an orchestration result.

Exemplarily, according to the orchestration result of the user-defined network request of the tourism company in 504, the user-defined gateway: 1) invokes the user and user group defining communications service from an HSS; 2) invokes the network defining communications service from an SGSN; 3) invokes the security defining communications service from the SGSN, an RNC, and a P-GW; 4) invokes the service defining communications service from a PCRF, the P-GW, and an MME, for example, the user-defined gateway invokes a video defining service from the PCRF and the P-GW, where a related user group is the business tourist group, caching is performed during busy time 18:30-21:00, and related charging is at a 1.5-times communications charging rate; 5) invokes the access defining communications service from the RNC and the SGSN; 6) invokes the bearer defining communications service from the PCRF; 7) invokes the statistical report generating communications service from the network performance reporting system; 8) invokes the event report generating communications service from the SGSN and the P-GW; and 9) invokes the charging defining communications service from the BOSS.

Exemplarily, when the user-defined gateway invokes the related communications service, the user-defined gateway may determine whether the communications service has been subscribed; and if the communications service has not been subscribed, the user-defined gateway may invoke an API of the BOSS system to complete subscription of the communications service.

Exemplarily, when the user-defined gateway selects a mobile network element to perform the orchestrated communications service, and if multiple mobile network elements are capable of providing the communications service, a corresponding mobile network element may be selected according to a preferred rule, such as a load balancing rule, to perform the communications service.

Exemplarily, after the mobile network element performs the corresponding communications service, a one-off or periodical invocation result may be returned according to features of different communications services.

Exemplarily, the user-defined gateway may further split the corresponding communications service into sub-communications services as required, invoke the mobile network element to perform the sub-communications services, and combine performing results of the sub-communications services to form an invocation result of the communications service.

Exemplarily, if an invocation of a certain communications service finally fails, the user-defined gateway may perform a rollback function to roll back a previously performed communications service and make the network recover to a state before the user-defined network is customized.

506. The user-defined gateway feeds back the invocation result to the MBB application server.

Exemplarily, the invocation result carries a generated identifier of the user-defined network of the tourism company, such as a virtual mobile network identifier (VMN-ID).

Up to now, the user-defined network has been successfully customized and can operate.

When the user-defined network request is used to modify an established user-defined network, similar to steps 501 to 506, in steps 504 and 505, the user-defined gateway orchestrates the corresponding communications service according to a corresponding user-defined request for modifying the user-defined network, and therefore no further details are provided herein.

When a user enters coverage of the user-defined network, a user equipment of the user is capable of accessing the established user-defined network and starts to use a service provided by the user-defined network.

Exemplarily, the user-defined gateway may initiate deletion of the user-defined network when the MBB application server initiates an unsubscription request of the user-defined network, or according to a configuration rule, for example, a life cycle of the user-defined network is 30 days.

In the example of the method for customizing a user-defined network provided in the embodiment shown in FIG. 8, an MBB application server customizes its user-defined network to bear its MBB application service, so that a requirement of the MBB application service and an MBB communications service resource are effectively matched, thereby implementing reasonable utilization of the MBB communications service resource.

A person skilled in the art can understand that information and signals may be expressed by using any technology techniques. For example, data, an instruction, a command, the information, the signals (signal), a bit, a symbol, and a chip may be expressed by a voltage, a current, an electromagnetic wave, a magnetic field or a magnetic particle (magnetic particles), an optical field or an optical particle (optical particles), or any combination thereof.

A person skilled in the art may further learn that various illustrative logical blocks (illustrative logic block) and steps (step) listed in the embodiments of the present invention may be implemented by using electronic hardware, computer software, or a combination of the two. For the purpose of clearly displaying interchangeability of hardware and software, functions of the foregoing various illustrative components and steps have been generally described. Whether such functions are implemented by using the hardware or the software depends on a particular application and a design requirement of the entire system. A person skilled in the art may use various methods to implement the functions for each particular application, but it should not be considered that such implementation goes beyond the protection scope of the embodiments of the present invention.

The various illustrative logical blocks, units, and circuits described in the embodiments of the present invention may implement or operate the described functions by using a design of a general processor, a digital signal processor, an application-specific integrated circuit (ASIC), a field programmable gate array (FPGA) or another programmable logical apparatus, a discrete gate or transistor logic, a discrete hardware component, or any combination thereof. The general processor may be a micro processor. Alternatively, the general processor may also be any traditional processor, controller, micro controller, or state machine. The processor may also be implemented by using a combination of computing apparatuses, such as the digital signal processor and the micro processor, multiple micro processors, one or more micro processors with one digital signal processor core, or any other similar configuration.

Steps of the methods or algorithms described in the embodiments of the present invention may be directly embedded into the hardware, a software unit performed by the processor, or a combination of the two. The software unit may be stored in a RAM memory, a flash memory, a ROM memory, an EPROM memory, an EEPROM memory, a register, a hard disk, a removable disk, a CD-ROM, or a storage medium in any other form in the art. Exemplarily, the storage medium may connect to the processor so that the processor is capable of reading information from the storage medium and writing information to the storage medium. Alternatively, the storage medium may also be integrated into the processor. The processor and the storage medium may be arranged in the ASIC and the ASIC may be arranged in a user equipment. Alternatively, the processor and the storage medium may also be arranged indifferent components of the user equipment.

In one or more exemplary designs, the foregoing functions described in the embodiments of the present invention may be implemented by using the hardware, the software, firmware, or any combination of the three. If being implemented in the software, these functions may be stored on a computer-readable medium or are transmitted to the computer-readable medium in a form of one or more instructions or code. The computer-readable medium includes a computer storage medium and a communications medium that enables a computer program to move from one place to another place. The storage medium may be an available medium that may be accessed by any general or special computer. For example, such computer-readable medium may include but is not limited to a RAM, a ROM, an EEPROM, a CD-ROM or another compact disk storage, a disk storage or another magnetic storage apparatus, or any other medium that may be used to bear or store program code, where the program code is in a form of an instruction or a data structure or in a form that can be read by the general or special computer or the general or special processor. In addition, any connection may be appropriately defined as the computer-readable medium. For example, if the software is transmitted from a website, a server, or another remote resource through a coaxial cable, an optical fiber computer, a twisted pair, a digital subscriber line (DSL) or in a wireless manner, such as infrared, radio, or microwave, the software is included in the defined computer-readable medium. The disk and the disc include a compressed disk, a laser disk, an optical disc, a DVD, a floppy disk, and a blue-ray disc. The disk generally copies data by a magnetic means, and the disc generally copies data optically by a laser means. The foregoing combination may also be included in the computer-readable medium.

The foregoing description of the specification in the present invention may enable a person skilled in the art to use or implement content of the present invention. Any modification based on the disclosed content shall be considered to be obvious in the art. A basic principle described in the present invention may be applied to another transformation but does not go beyond the invention essence and scope of the present invention. Therefore, the content disclosed in the present invention is not merely limited to the described embodiments and designs, but may also be extended to a maximum scope that is consistent with a principle and a disclosed new feature of the present invention.

What is claimed is:

1. A gateway, comprising:
   a first interface, configured to interact with a mobile broadband (MBB) application server bearing an MBB application;
   a second interface, configured to interact with a mobile network element; and
   a controller, configured to:
   receive a user-defined network request from the MBB application server through the first interface,
   request, according to the user-defined network request and through the second interface, an invocation of a communications service corresponding to the mobile network element to establish or modify a user-defined network,
   return an invocation result to the MBB application server through the first interface,
   wherein the user-defined network request comprises definition information of a communications service resource required by the MBB application, and is used to request establishment or modification of the user-defined network, and
   authenticate the MBB application through the first interface to determine whether to request the invocation of the communications service corresponding to the mobile network element.

2. The gateway according to claim 1, wherein the definition information of the communications service resource comprises:
   user definition information used to define a user of the user-defined network.

3. The gateway according to claim 2, wherein the user definition information comprises personal user information, device user information, or user group information.

4. The gateway according to claim 1, wherein the definition information of the communications service resource comprises:
   network definition information used to define coverage of the user-defined network.

5. The gateway according to claim 4, wherein the network definition information comprises geographical area information, physical network area information, or virtual subnet information.

6. The gateway according to claim 1, wherein the definition information of the communications service resource comprises:
   behavior definition information used to define an action or a condition of a user of the user-defined network on the user-defined network.

7. The gateway according to claim 6, wherein the behavior definition information comprises security definition information, service definition information, access definition information, bearer definition information, operation and maintenance definition information, or condition definition information.

8. The gateway according to claim 1, wherein the controller is configured to:
   orchestrate, according to the user-defined network request, the communications service corresponding to the mobile network element to establish or modify the user-defined network; and
   request the invocation the corresponding communications service through the second interface according to an orchestration result.

9. The gateway according to claim 1, wherein:
   the user-defined gateway further comprises a third interface configured to interact with a business and operation support system (BOSS); and
   the controller is further configured to subscribe to the corresponding communications service on the BOSS through the third interface and create a bill of the corresponding communications service based on the BOSS through the third interface.

10. The gateway according to claim 1, wherein the controller is further configured to report an operational report of the user-defined network to the MBB application server through the first interface.

11. The gateway according to claim 1, wherein the controller is further configured to initiate deletion of the user-defined network according to a request from the MBB application server or according to a configuration rule.

12. The gateway according to claim 1, wherein when the controller is configured to request the invocation of the communications service corresponding to the mobile network element to establish the user-defined network, the invocation result comprises an identifier of the user-defined network.

13. A method for customizing a user-defined network, the method comprising:
   receiving, by a gateway, a user-defined network request from a mobile broadband (MBB) application server bearing an MBB application, wherein the user-defined network request comprises definition information of a communications service resource required by the MBB application and used to request establishment or modification of the user-defined network;
   requesting, by the gateway according to the user-defined network request, an invocation of a communications service corresponding to a mobile network element to establish or modify the user-defined network;
   returning, by the gateway, an invocation result to the MBB application server; and
   authenticating, by the gateway, the MBB application to determine whether to invoke, according to the user-defined network request, the communications service corresponding to the mobile network element.

14. The method according to claim 13, wherein the definition information of the communications service resource comprises at least one of:
   user definition information, network definition information, or behavior definition information, wherein the user definition information is used to define a user of the user-defined network, the network definition information is used to define coverage of the user-defined network, the behavior definition information is used to define an action or a condition of a user of the user-defined network on the user-defined network.

15. The method according to claim 13, wherein requesting the invocation comprises:
   orchestrating, by the gateway according to the user-defined network request, the communications service corresponding to the mobile network element to establish or modify the user-defined network; and
   requesting, by the gateway, the invocation of the corresponding communications service according to an orchestration result.

16. The method according to claim 13, further comprising:
   initiating, by the gateway, deletion of the user-defined network according to a request from the MBB application server or according to a configuration rule.

17. The method according to claim 13, wherein when the user-defined gateway requests, according to the user-defined network request, the invocation of the communications service corresponding to the mobile network element to establish the user-defined network, the invocation result comprises an identifier of the user-defined network.

18. A telecommunications system, comprising:
   a gateway, configured to:
      receive a user-defined network request from a mobile broadband (MBB) application server bearing an MBB application,
      request, according to the user-defined network request, an invocation of a communications service corresponding to a mobile network element to establish or modify the user-defined network,
      return an invocation result to the MBB application server, wherein the user-defined network request comprises definition information of a communications service resource required by the MBB application and used to request establishment or modification of the user-defined network,
      authenticate the MBB application to determine whether to invoke, according to the user-defined network request, the communications service corresponding to the mobile network element; and
   wherein the mobile network element is configured to implement invocation of the corresponding communications service.

* * * * *